(12) United States Patent  
Swisher (10) Patent No.: US 7,230,882 B2
(45) Date of Patent: Jun. 12, 2007

(54) TRANSDUCER SUPPORT AND ASSOCIATED LOCK

(75) Inventor: Steven Louis Swisher, Broken Arrow, OK (US)

(73) Assignee: Lowrance Electronics, Inc., Tulsa, OK (US)

( * ) Notice: Subject to any disclaimer, the term of this patent is extended or adjusted under 35 U.S.C. 154(b) by 356 days.

(21) Appl. No.: 10/934,578

(22) Filed: Sep. 3, 2004

(65) Prior Publication Data

US 2006/0050615 A1   Mar. 9, 2006

(51) Int. Cl.
*H04R 1/44*   (2006.01)

(52) U.S. Cl. ...................................................... 367/173

(58) Field of Classification Search ................ 367/173; 248/310, 291.1
See application file for complete search history.

(56) References Cited

U.S. PATENT DOCUMENTS

| 1,192,001 | A |   | 7/1916  | Ryan |   |
|-----------|---|---|---------|------|---|
| 1,619,512 | A |   | 3/1927  | Heckman |   |
| 2,449,085 | A |   | 9/1948  | Peterson |   |
| 2,572,340 | A |   | 10/1951 | Hockenhull |   |
| 3,041,770 | A |   | 7/1962  | Witbro |   |
| 3,058,386 | A |   | 10/1962 | Morrow |   |
| 3,752,431 | A | * | 8/1973  | McBride | ................. 248/291.1 |
| 3,992,737 | A |   | 11/1976 | Duel et al. |   |
| 4,057,180 | A |   | 11/1977 | Whittaker |   |
| 4,169,572 | A |   | 10/1979 | Simon |   |
| 4,330,895 | A |   | 5/1982  | Putman et al. |   |
| 4,354,651 | A |   | 10/1982 | Simon |   |
| 4,361,057 | A |   | 11/1982 | Kochera |   |
| 4,462,330 | A |   | 7/1984  | Campbell et al. |   |
| 4,735,166 | A | * | 4/1988  | Dimalanta | .................. 114/146 |
| 4,805,337 | A |   | 2/1989  | Kurata |   |
| 4,888,747 | A |   | 12/1989 | Williams |   |
| 4,928,915 | A | * | 5/1990  | Havins | ....................... 367/173 |
| D312,794  | S |   | 12/1990 | Healey |   |
| 4,979,153 | A | * | 12/1990 | Terry | .......................... 367/173 |
| 4,982,924 | A | * | 1/1991  | Havins | ....................... 367/173 |
| 4,988,996 | A |   | 1/1991  | Ito |   |

(Continued)

FOREIGN PATENT DOCUMENTS

WO          WO 95/02322        1/1995

OTHER PUBLICATIONS http://www.in-fisherman.com/magazine/articles/IF2708_sonor_wars/.
http://www.marcumtech.com/icearm-layout.htm.
http://www.fishandgame.com/icefish/thruhole.htm.
www.the-clam.com.

(Continued)

*Primary Examiner*—Ian J. Lobo
(74) *Attorney, Agent, or Firm*—Alston & Bird LLP (57) ABSTRACT

The present invention is directed to an improved support and lock for use in conjunction with a mobile sonar unit or other device. The improved support is rotatably coupled to the sonar unit base by a coupling assembly. A stabilizing member is slideably coupled to the distal end of the support via a locking assembly. Advantageously, the support maintains an object, such as a transducer, in a selected position and is able to resist deflection despite adverse environment conditions. Further, the disclosed locking assembly can be used for a wide variety of other applications.

23 Claims, 7 Drawing Sheets

U.S. PATENT DOCUMENTS

| | | |
|---|---|---|
| 4,995,009 A | 2/1991 | Altmire et al. |
| 5,173,882 A | 12/1992 | Watson |
| 5,184,414 A | 2/1993 | Downs |
| 5,230,646 A | 7/1993 | Thorup |
| 5,231,610 A | 7/1993 | Barksdale, Jr. et al. |
| 5,253,220 A | 10/1993 | Wilson, Sr. |
| 5,260,912 A | 11/1993 | Latham |
| 5,546,362 A | 8/1996 | Baumann et al. |
| 5,573,221 A * | 11/1996 | Reeves ........................ 367/173 |
| 5,771,205 A | 6/1998 | Currier et al. |
| 5,887,376 A | 3/1999 | Currier et al. |
| 6,002,647 A | 12/1999 | Grall |

OTHER PUBLICATIONS http://www.tonydean.com/equip.html?sectionid=191.

http://www.vexilar.com/help/tips/tip010.html.

http://www.thornebros.com/winter/electronics/electronics_other/ice_box.html.

www.vexilar.com.

Exhibit A, Jul. 6, 2003.

Model LFP 300 Fish LO-K-TOR; Lowrance Electronics Installation and Operation Manual.

* cited by examiner

TRANSDUCER SUPPORT AND ASSOCIATED LOCK

BACKGROUND OF THE INVENTION

1. The Field of the Invention

The present invention relates generally to sonar devices and, more particularly, the invention relates to a sonar device having a sonar transducer submerged in water extending from an arm supporting the transducer.

2. Description of Related Art

Over the last several decades, commercial and recreational fishermen alike have sought more effective tools to find and catch fish. One of the most effective tools to date has been sonar depth finder units. These units provide fishermen with a virtual picture of a local underwater environment. This picture, allows fishermen to determine if fish are actually present in the area, but perhaps more effectively, it allows fishermen to locate underwater structures where fish are known to congregate. As a result, fishermen may selectively fish over such areas thereby increasing their odds of success.

Generally, fish finding units consist of a sonar display, a base for mounting the display, a sonar transducer, and an electrically conductive cable for electrically connecting the transducer to the sonar display. During use, the sonar transducer transmits ultrasonic signals that travel outwardly in a cone-shaped pattern, until striking the bottom of the body of water, submerged structures, or the fish themselves. Upon striking any of these objects, the ultrasonic signals are reflected, thereby creating echo signals that are received by the transducer. These signals are electrically transmitted to the display, which converts the echo signals into electronic signals. The electronic signals are used by the display to generate a visual representation of the local underwater environment.

Conventionally, the fish finding units described above are mounted on fishing boats and are powered by the boat's onboard power source. The unit's transducers are generally mounted to the transom or hull of the boat. In many circumstances, however, the use of a sonar fish finder may be desired in environments that are not conducive to fishing from a boat. For example, fishermen may require use of a sonar depth finder when fishing in shallow channels, along river banks, from piers or when ice fishing. Accordingly, fish finding units operated in these environments cannot rely on a boat for power or structural support. In particular, such units must be mobile, self-contained, and capable of transmitting a directed sonar signal.

In response, mobile fishing depth finder units have been developed according to the known prior art. Specifically, conventional mobile units have developed for use in ice fishing applications. These mobile ice fishing units consist of a sonar display, a base for mounting the display, a sonar transducer, a local energy source and an electrically conductive cable for mechanically supporting and electrically connecting the transducer to the sonar display. During fishing, the display is mounted to the base and positioned on a body of ice adjacent an ice fishing hole. The sonar transducer is placed within the hole such that the transducer is supported by the conductive cable below the ice. Accordingly, a "plumb-bob" configuration is produced wherein gravity acts to straighten the support cable thereby positioning the transducer substantially below the ice fishing hole.

As conventional units are used more frequently, it has become apparent that they possess a number of significant drawbacks. For example, conventional units do not operate effectively in moving water. In particular, when a plumb-bob type transducer is deposited within a rapidly moving stream or provided in a body of water having underwater currents, the transducer is deflected off-line. As described above, it is important for an effective fisherman to know the location and orientation of the sonar transducer. This information allows the fisherman to ensure that the visual information provided by the sonar display, actually represents the targeted local underwater environment. Thus, if a transducer is deflected off-line by an underwater current or other similar body of moving water, the fish finding unit is left to undesirably describe an area that has not been targeted by the fisherman. Also, the fisherman is left largely unaware that the fish finder is not displaying the intended viewing area.

Accordingly, it is desirable then to produce a fish finder unit having a transducer, which is securely supported in a known operating position either in standing or flowing water. Further, it is desirable to produce fish finder unit that is compact, mobile and easy to use. Finally, it is desirable to produce a fish finder unit having a transducer that may be quickly and easily deployed into a preferred viewing area beneath the water.

BRIEF SUMMARY OF THE INVENTION

The present invention overcomes these and other limitations of the above-described prior art by providing a transducer support and associated lock for effective use with sonar units or other devices in a variety of environments. In particular, several embodiments of the present invention comprise a sonar unit having a display, a mounting platform or base, a transducer, a support, a stabilizing member, and a cable for electrically connecting the transducer and the display. A local energy source is provided to electrically power the sonar unit.

According to one embodiment of the present invention, the support functions to carry the weight of the transducer during use. In another embodiment, the support includes proximate and distal ends. The stabilizing member is releasably attached to the distal end of the support via a locking assembly. In one embodiment, the stabilizing member supports the transducer during generation. The locking assembly comprises a lock configured to engage an internally threaded aperture provided at the distal end of the support. The lock comprises a body having a threaded exterior surface and opposed first and second ends. A bore for receiving the stabilizing member is provided within the body, extending longitudinally between the first and second ends. In one embodiment, the internally threaded aperture is tapered such that as the lock engages the internally threaded aperture in a screw-like manner the bore is constricted as the lock is drawn downwardly, thereby frictionally engaging the stabilizing member to remain "locked" in a desired position. In another embodiment, the lock itself is tapered and the internally threaded aperture is substantially cylindrical such that the first end of the lock is constricted as the lock is drawn downwardly, thereby constricting the bore and "locking" the stabilizing member in a desired position. In another embodiment, the support includes two curved lock retaining members that extend outwardly from the distal end of the support to define the threaded aperture. In one embodiment, the curved lock retaining members do not completely encircle the threaded aperture, thereby defining a slot.

In another embodiment, the lock includes first and second interior surfaces that are structured within the lock body. The surfaces extend outwardly and radially from the bore to define an opening. According to one embodiment, the opening may be forced closed as the lock is drawn downwardly into the internally threaded aperture, thereby further constricting the bore and frictionally engaging the stabilizing member of the support. In another embodiment, the slot defined by the curved lock retaining members described above aligns with the opening defined within the lock to define a release position wherein the stabilizing member may be laterally released from the locking assembly.

In another embodiment, the lock may further include a grip for facilitating tactile manipulation by a user. In one embodiment, the grip includes at least one radially extending flange. In another embodiment, the grip includes a plurality of detents. In still another embodiment, the grip may be omitted, and the lock may be rotated by a motor, actuator or other similar device.

In another embodiment, the transducer may be rotatably coupled to the stabilizing member by a fastener. According to this embodiment, the fastener includes locked and unlocked positions such that the transducer is fixed relative to the stabilizing member in the locked position and free to rotate relative to the stabilizing member in the unlocked position. In another embodiment, the fastener includes a pin and nut configuration.

In still another embodiment, the support is rotatably coupled to the base at its proximate end via a coupling assembly. The coupling assembly includes a coupler positioned at the proximate end of the support for engaging a receptacle provided within the base. The coupler includes a collar portion and a sleeve portion wherein the transition between the collar portion and the sleeve portion defines a downwardly directed toothed surface. The receptacle comprises an upwardly directed rim defining a bore through the base, wherein the rim includes an upwardly directed toothed surface. During use, the downwardly directed toothed surface of the coupler engages the upwardly directed toothed surface of the receptacle to hold the support in a desired position. In another embodiment of the present invention, the toothed portions of the coupler and receptacle may have rounded tooth surfaces such that the coupler may be disengaged from the receptacle without significant lifting force.

Thus, there is provided an improved transducer support and associated lock having a more robust and durable design that is capable of assisting a user as they adjust the unit for use in different environments. Advantageously, the present invention provides a support and lock assembly for securing a transducer or other object at a desired vertical position regardless of the environment. For example, in sonar unit applications, the support and associated lock of the present invention is particularly useful when fishing in freshwater lakes or rivers from docks, boats, riverbanks, ice fishing, etc. Alternatively, the present invention may be used when saltwater fishing from shore, piers, or other similar structures. Essentially, the present invention is useful in all applications where a light-weight, portable fish finding unit is desired.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 6A and 6B are top views of a locking assembly according to the embodiment depicted in FIG. 5, wherein FIG. 6A depicts the locking assembly in a fixed position and FIG. 6B depicts the locking assembly in a released position.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is directed to a support for a transducer or other object that provides improved stability and durability. Although the present application periodically makes reference to sonar units and specifically to sonar ice fishing units, the present invention is not limited to such applications and instead such references are provided merely to illustrate the durability and accuracy of the support structure. The present invention and the inventive concepts herein may be applied to support structures used in any environment where it is advantageous to accurately position an object (e.g., a transducer, etc.) a distance from the support structure.

Figure 1:
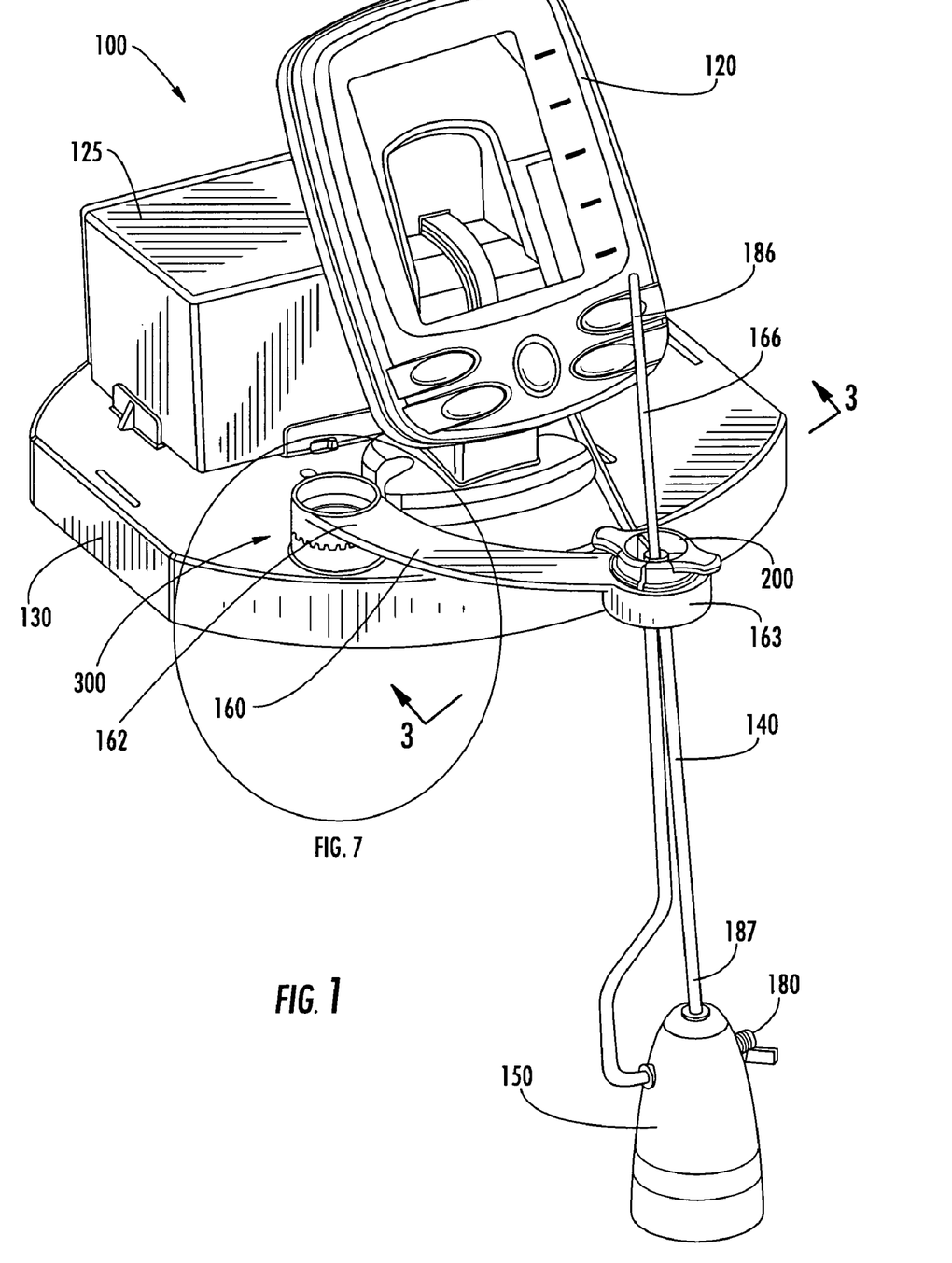
FIG. 1 is a perspective view of a sonar unit in accordance with one embodiment of the present invention.

FIG. 1 illustrates a perspective view of a sonar unit 100 in accordance with one embodiment of the present invention. According to the depicted embodiment, the sonar unit 100 comprises a control/display unit 120, a mounting platform or base 130, a transducer 150, a support 160, a stabilizing member 166 and a cable 140 for electrically connecting the transducer 150 and the control/display unit 120. A local energy source 125 is provided to electrically power the sonar unit 100. In addition, the embodiment illustrated by FIG. 1 also includes a locking assembly 200 and a coupling assembly 300 for providing improved structural support to a submerged transducer 150, as will be described in further detail below.

According to one embodiment of the present invention, the base 130 is placed on a surface adjacent a body of water having a preferred viewing area, i.e., the area of the water to be scanned. For example, the base 130 may be placed on an ice surface adjacent an ice fishing hole during winter or on a dock adjacent a lake during summer months. The control/ display 120 and its associated local energy source 125 are mounted to the base 130 and electrically connected to a transducer 150 via a conductive cable 140. A support 160 carries the weight of the transducer 150 and further allows manipulation of the transducer's horizontal position during use. The support 160 includes proximate 162 and distal 163 ends. In one embodiment, the support 160 is rotatably coupled to the base 130 at its proximate end 162 via a coupling assembly 300. According to the embodiment depicted in FIG. 1, a stabilizing member 166 is releasably attached to the distal end 163 of the support 160 so as to carry the weight of the transducer 150 and provide horizontal stability to the transducer 150 during use. According to various embodiments of the present invention, the claimed stabilizing member 166 may include a rigid or semi-flexible rod (as shown) or other similar support device as will be apparent to one of ordinary skill in the art.

According to one embodiment, the transducer 150 is properly positioned within a preferred viewing area by physical manipulation of the unit by a user. Generally, the preferred viewing area, e.g., an area in the water to be scanned with sonar, is an area adjacent the sonar unit 100, such as, in ice fishing applications, an ice fishing hole. In other applications, the preferred viewing area may be the water immediately adjacent a boat, dock or pier, etc. In non-sonar applications this area may simply be an area generally remote from the base 130. According to the depicted embodiment, the transducer 150 is positioned over the viewing area by swinging the support 160 outwardly. The stabilizing member 166 (and attached transducer 150) may then be lowered into the preferred viewing area as described below.

In this regard, the stabilizing member 166 includes a length defined by opposed ends 186, 187. In one embodiment, the stabilizing member 166 is releasably coupled to the distal end 163 of the support 160 via a locking assembly 200. In another embodiment, the transducer 150 is pivotally attached to a first opposed end 187 of the stabilizing member 166 by a fastener 180 as shown. Accordingly, the first opposed end 187 of the stabilizing member 166 (and attached transducer 150) may be lowered into the preferred viewing area by releasing the locking assembly 200. As will be apparent to one of ordinary skill in the art, the length of the stabilizing member 166 may relate to the range of viewing depths that are available for the transducer 150.

Figure 2:
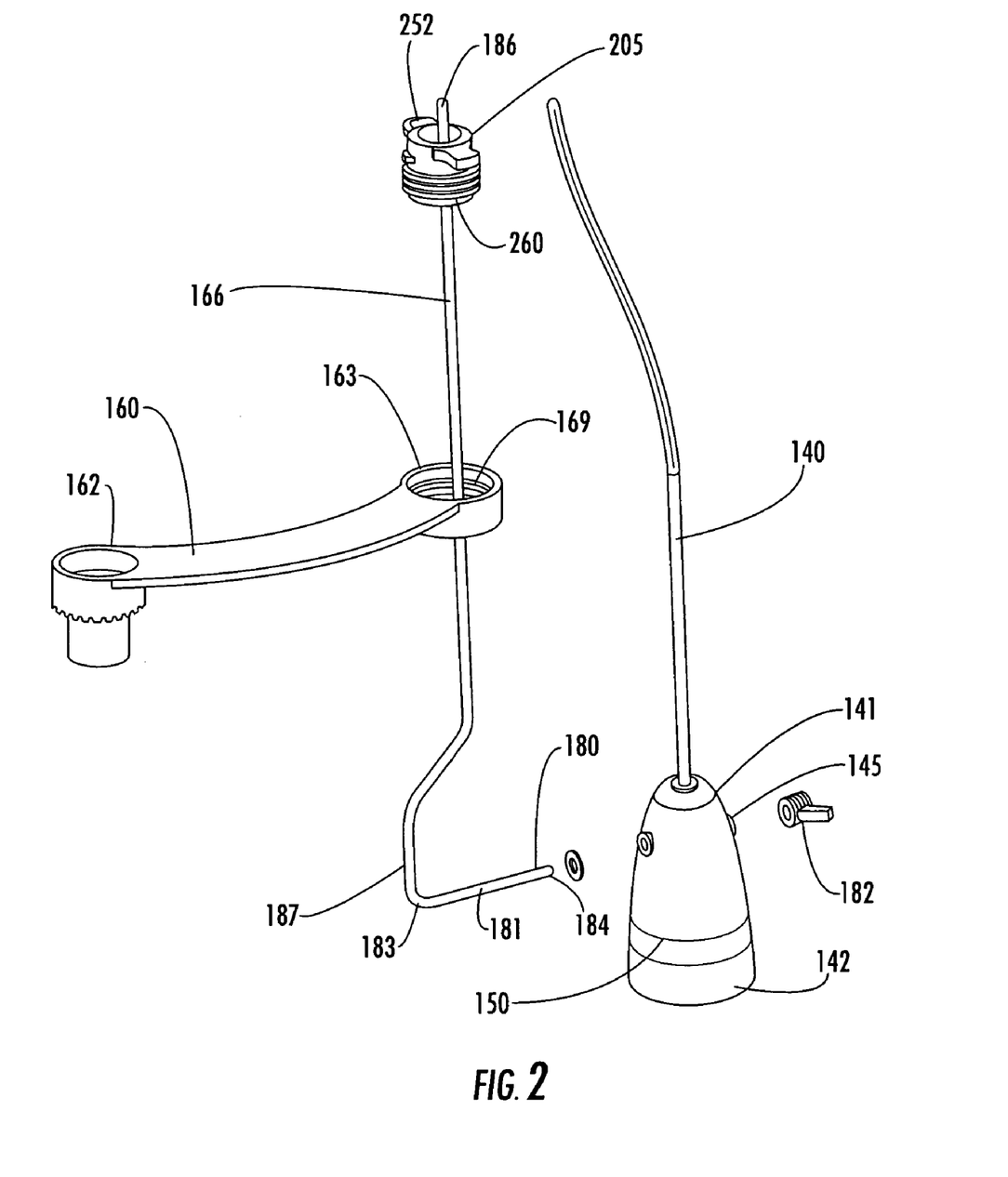
FIG. 2 is an enlarged partially exploded view of a transducer support arm in accordance with one embodiment of the present invention.

FIG. 2 illustrates a partially exploded view of the support 160, the transducer 150, the stabilizing member 166, and the locking assembly 200 in accordance with one embodiment of the present invention. As described in greater detail below with regard to FIG. 3, the locking assembly 200 includes a lock 205 having a threaded exterior surface 220 and an internally threaded aperture 169 positioned within the distal end 163 of the support 160 as shown. The internally threaded aperture 169 is configured to receive the lock 205. In one embodiment, the locking assembly 200 functions to provide selective vertical positioning of the stabilizing member 166 and the transducer 150. In other embodiments, the locking assembly 200 may provide selective positioning of various other objects (not shown). In those embodiments having a transducer 150, an electrically conductive cable 140 is also provided to electrically connect the transducer 150 and sonar control/display unit 120. Alternatively, in other embodiments, the transducer 150 may be wirelessly connected to the control/display (not shown) via Bluetooth, RF signal communication or other wireless communication or other similar techniques as known to one of ordinary skill in the art.

In various embodiments of the invention, a bore 260 is provided that extends through the lock 205 for receiving the stabilizing member 166. In one embodiment, as described below, the bore 260 is capable of constricting the stabilizing member 166 to define "locked" and "unlocked" positions. When "locked," the stabilizing member 166 is restricted from translating vertically due to frictional forces between the bore 260 and the stabilizing member 166. In the "unlocked" position, the stabilizing member 166 is slidable relative to the lock 205 and, thus, the stabilizing member 166 and attached transducer 150 may be adjusted between depths within the viewing area for more effective use. According to the depicted embodiment, the lock 205 may be actuated between locked and unlocked positions by rotating or twisting. As will be apparent to one of skill in the art, such movements allow the threads on the exterior of the lock to engage the internally threaded aperture 169 of the support 160. In one embodiment, the lock 205 is rotated by the physical manipulation of a user. In other embodiments, the rotation of the lock 205 is automated and performed by a motor, actuator or other similar means.

According to the embodiment illustrated in FIG. 2, other components cooperate to support the transducer 150. In one embodiment, a fastener 180 may be provided to pivotally couple the transducer 150 to a first opposed end 187 of the stabilizing member 166. According to the depicted embodiment, the fastener 180 includes a pin 181 configured to engage a nut 182. The pin 181 includes proximate 183 and distal 184 ends. The proximate end 183 of the pin 181 is attached or integral to the first opposed end 187 of the stabilizing member 166. In one embodiment, the transducer 150 defines upper 141 and lower 142 ends, and includes a bore 145 that extends laterally through its upper end 141. The bore 145 is configured to receive the pin 181 such that it may be engaged and held by the nut 182 as shown. Accordingly, the transducer 150 may be fixed in a locked angular position as apparent to one of skill in the art. In the locked position, the transducer 150 is prevented from rotating. By loosening the nut 182 the transducer 150 may be returned to an unlocked position wherein the transducer 150 is freely rotatable.

Although depicted as comprising a pin and nut configuration, various embodiments of the invention may include fasteners 180 of other configurations known in the art. It is noted, that by pivotally coupling the transducer 150 to a stabilizing member 166, such as a vertically oriented rod, tube, etc., the present invention provides enhanced versatility for transducer imaging. For example, in calm water, the transducer 150 may be secured loosely by the depicted fastener 180, perhaps by loosening the nut 182 as described above and, thus, gravity is allowed to direct the transducer 150 downwardly producing a substantially vertical sonar-sensing cone. In other environments having moving water or currents, a more structured support may be needed to prevent the transducer 150 from being knocked off-line. Accordingly, the transducer fastener 180 may be tightened, thereby allowing the stabilizing member 166 or rod to resist the force applied to the transducer 150 by the current or other external force. Finally, in another embodiment, a side-scanning functionality is provided. In particular, a user may simply direct the transducer 150 laterally to a desired sensing angle and tighten the fastener 180 to lock the unit in place.

Figure 3A:
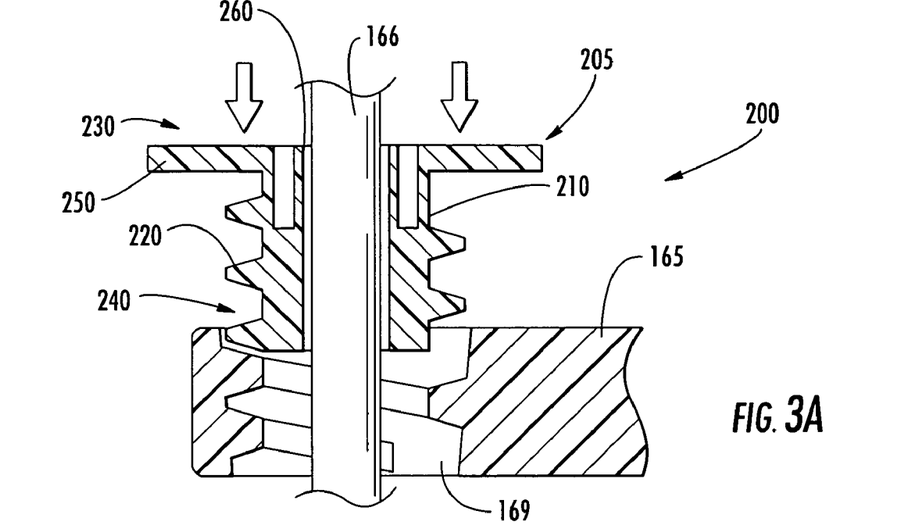
FIG. 3A is section view of a locking assembly, taken along section line 3—3 of FIG. 1, in accordance with one embodiment of the present invention.
Figure 3B:
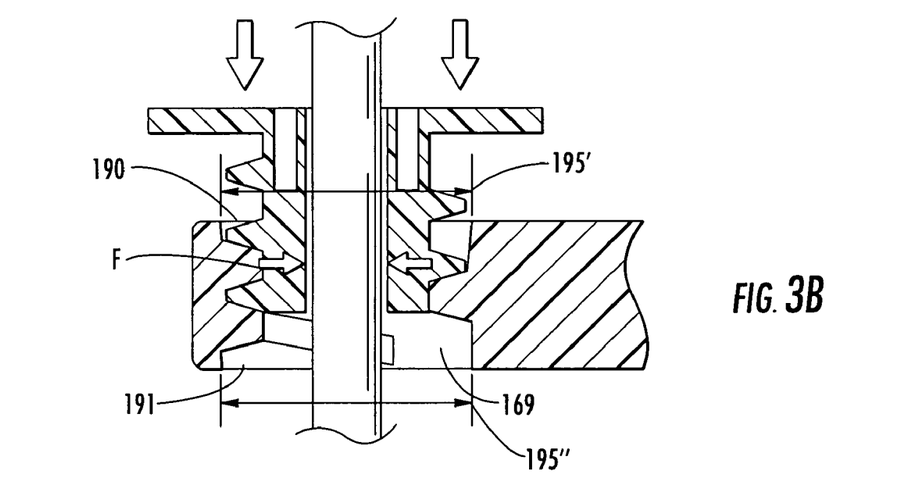
FIG. 3B is section view of a locking assembly, taken along section line 3—3 of FIG. 1, in accordance with one embodiment of the present invention.
Figure 3C:
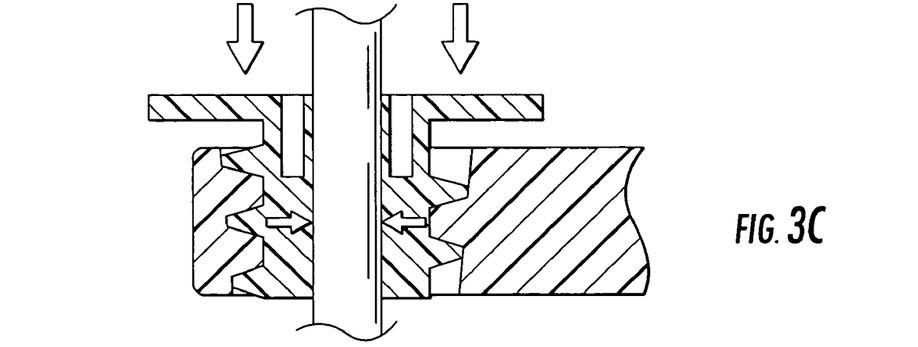
FIG. 3C is section view of a locking assembly, taken along section line 3—3 of FIG. 1, in accordance with one embodiment of the present invention.

FIGS. 3A–3C provide a detailed section view of a locking assembly 200, in accordance with one embodiment of the present invention. Regarding FIG. 3A, a lock 205 is depicted for facilitating the selective vertical positioning of the stabilizing member 166 relative to the support 160. According to the depicted embodiment, the lock 205 includes a lock body 210 having a circular cross-section and a threaded external surface 220. The lock 205 is configured to rotatably engage a similarly shaped internally threaded aperture 169. As referenced above, the internally threaded aperture 169 is defined by the distal end 163 of the support 160. In addition to its threaded exterior surface 220, the lock body 210 includes opposing first 230 and second 240 ends as shown. A bore 260 for slidably receiving the stabilizing member 166 is provided through the lock body 210, extending between its first 230 and second 240 ends.

It is noted, that although FIGS. 1–6 depict the lock 205 and the associated internally threaded aperture 169 as having a substantially cylindrical shape, the present invention is not limited to such a configuration. In fact, the lock 205 and internally threaded aperture 169 may comprise any shape having a circular cross-section (e.g., cylindrical, conical, frusto-conical, funnel-shaped, and the like) so long as they are configured to rotatably engage one another.

In one embodiment, the lock 205 further includes a grip 250 disposed at the first end 230 of the lock body 210. The grip 250 provides a tactile gripping surface for users to manipulate when adjusting the position of the stabilizing member 166 and attached transducer 150 (not shown). According to the depicted embodiment, the grip 250 includes at least one radially extending flange 252. Accordingly, a user is afforded proper leverage so as to provide effective rotation force to the lock 205. In other embodiments, the grip 250 may include a series of detents (not shown) or other similar tactile gripping means as known to one of ordinary skill in the art. In automated embodiments as described above, where the rotation of the lock is controlled by a motor or other device, the grip 205 may be optionally omitted and replaced with teeth, gears or other structures for engaging the motor.

In another embodiment of the present invention, at least a portion of the lock 205 is comprised of a thermoplastic elastomer. Advantageously, according to this embodiment the lock 205 effectively maintains its shape in hot and cold temperatures. In other embodiments, other polymers, rubbers, composites, or the like may be selected to completely or partially comprise the lock 205 as known to one of ordinary skill in the art.

According to the embodiments illustrated in FIGS. 3B and 3C, the threaded external surface 220 of the lock body 210 rotatably engages the internally threaded aperture 169 of the support 165. Although the threaded external surface 220 of the lock body 210 and the internally threaded aperture 169 are depicted as having a male/female thread configuration respectively; other embodiments of the present invention may have the opposite thread configuration (e.g., the lock body may have female threads and the internally threaded aperture may have male threads) as known to one of ordinary skill in the art.

According to the depicted embodiment, the lock 205 operates by rotation. In particular, a user engages the internally threaded aperture 169 by grasping and rotating the lock 205 in a screw-like manner. As a result, the lock 205 is drawn downwardly into the internally threaded aperture 169. According to one embodiment, the internally threaded aperture 169 includes entrance 190 and exit 191 ends and is at least partially tapered such that the diameter 195' of the aperture 169 at the entrance end 190 is greater than the diameter 195" of the aperture 169 at the exit end 191. Accordingly, as the lock 205 translates downwardly within the aperture 169, an inwardly directed force "F" is applied to the lock body 210 as shown. The inwardly directed force "F" is transmitted through the lock body 210 and applied to the bore 260. As a result, downward translation by the lock 205 produces a constriction of the bore 260, thereby frictionally engaging the stabilizing member 166 to remain in place. Accordingly, the lock 205 is thereby engaged from an "unlocked" to a "locked" position.

In other embodiments, the lock body 210 and internally threaded aperture 169 may be oppositely tapered. Specifically, the lock body 210 may be tapered to have a larger first end 230 and a smaller second end 240 while the internally threaded aperture 169 may possess a substantially cylindrical shape (not shown). As described above, rotation of the lock 205 draws the lock body 210 downwardly into the aperture 169 and simultaneously produces an inwardly directed force "F" as shown. In the depicted embodiment, the inwardly directed force "F" is produced by the internally threaded aperture's 169 resistance to accepting the larger first end 230 of the lock body 210. The inwardly directed force "F" compresses the lock body 210, thus, constricting the bore 260 and locking the stabilizing member 166 in place.

Figure 4:
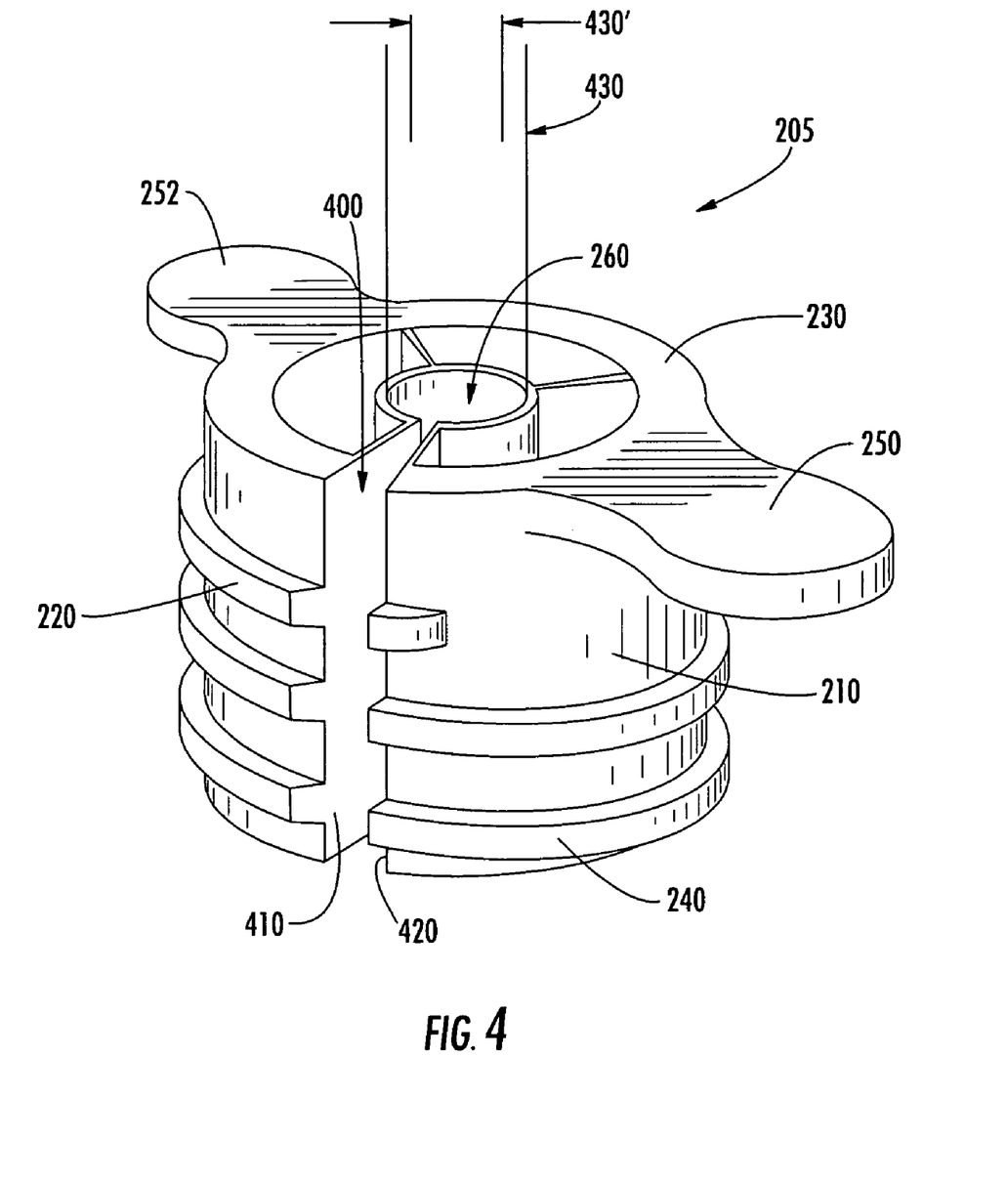
FIG. 4 is a detail view of a lock according to one embodiment of the present invention.

In another embodiment, as illustrated in FIG. 4, an opening 400 may be defined within the lock body 210 to facilitate further constriction of the bore 260 around the stabilizing member (not shown). The opening 400 is configured longitudinally between the first 230 and second 240 ends of the lock body 210 as shown. The opening 400 is defined by first 410 and second 420 interior surfaces, which extend radially and outwardly from the bore 260 as shown. As is apparent, locks having such openings possess a substantially c-shaped body, wherein the bore 260 and opening 400 define the open part of the "C." When such c-shaped locks 205 are engaged into the threaded aperture 169 as described above, the lock opening 400 is gradually forced closed by the tapered locking assembly configurations described above. Accordingly, when rotated downwardly into the threaded aperture (not shown), the diameter of the bore 430 is reduced to a constricted diameter 430' as shown.

Figure 5:
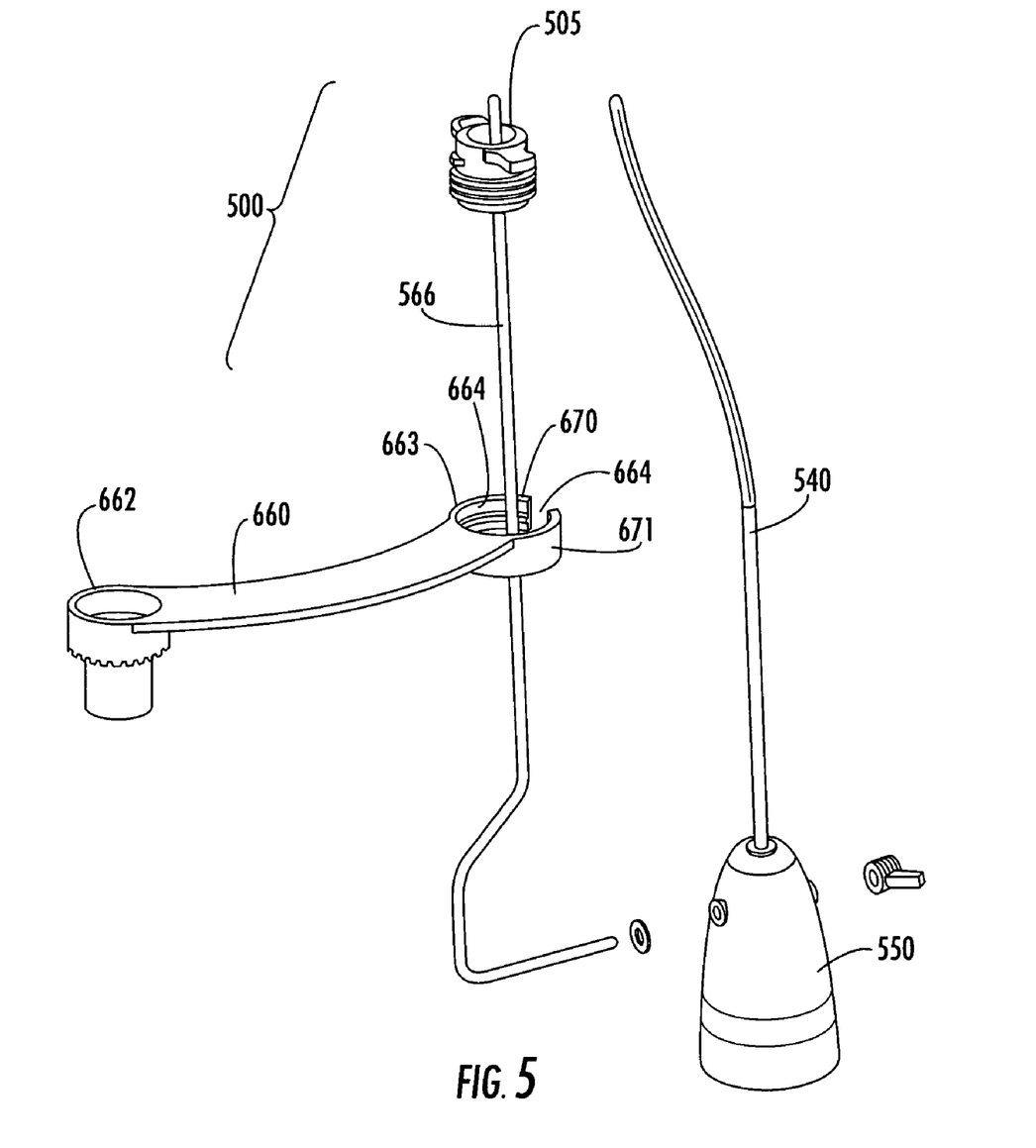
FIG. 5 is an exploded view of a locking assembly, according to another embodiment of the present invention.
Figure 6A:
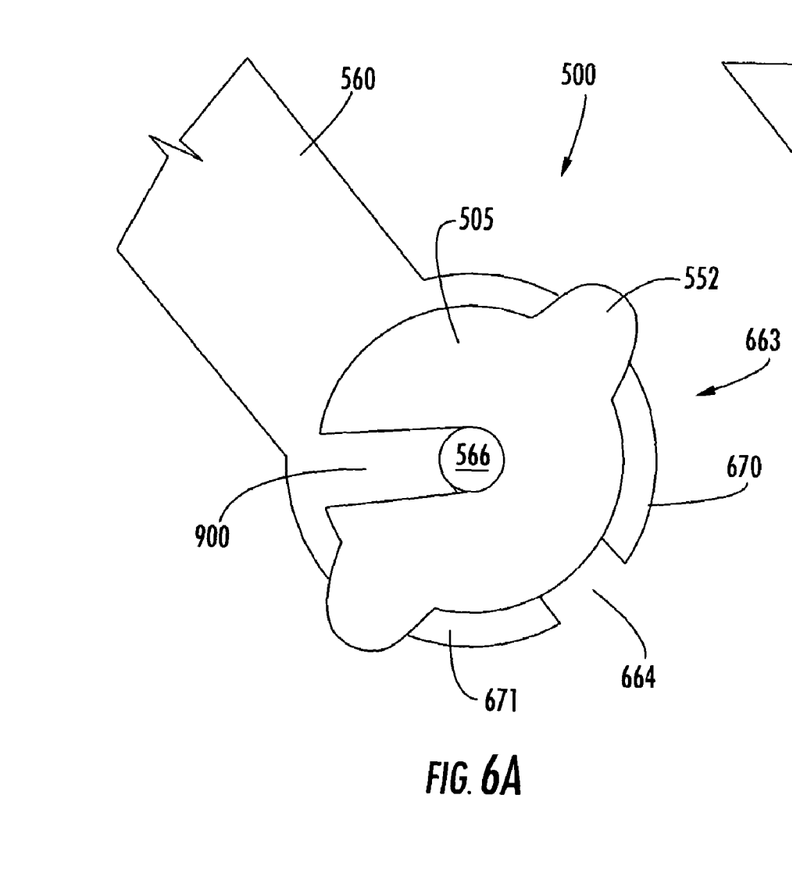
Figure 6B:
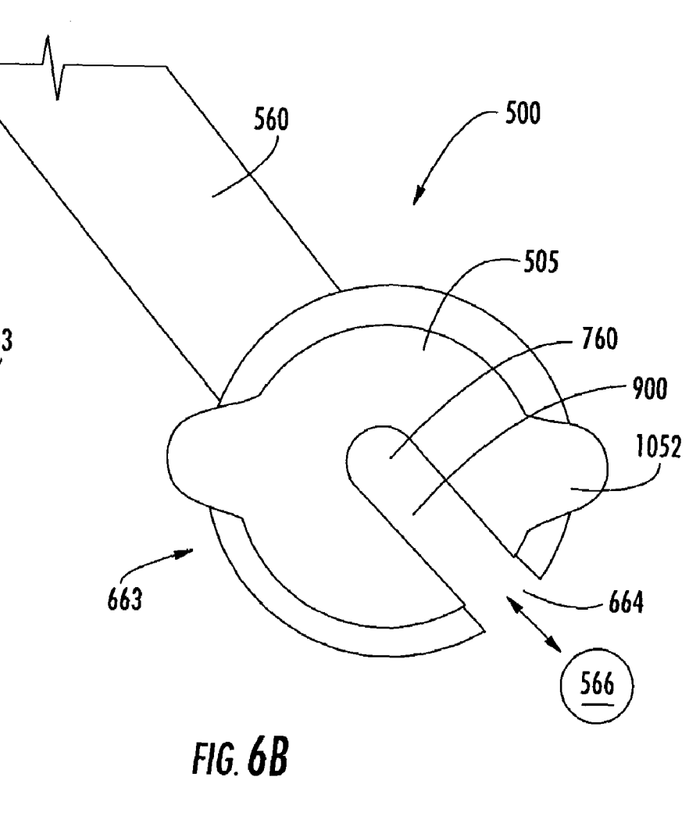

FIGS. 5 and 6 illustrate a partially exploded locking assembly 500 for optionally retaining a stabilizing member 566 in a fixed vertical position in accordance with another embodiment of the present invention. In the depicted embodiment, the locking assembly 500 comprises a lock 505 having an opening as described above that is configured in rotating engagement with a threaded aperture 669 of a particular design. In the depicted embodiment, the threaded aperture 669 is defined by first and second lock retaining members 670, 671 that extend outwardly from the distal end 663 of the support 660 as shown in FIG. 5. In one embodiment, the first and second locking retaining members 670, 671 do not completely encircle the threaded aperture 669, thus defining a slot 664 as shown. In one embodiment, the slot 664 (and the opening defined by the lock) are sufficiently sized to accommodate direct removal of a vertically aligned stabilizing member 566. Accordingly, in one embodiment, the opening of the lock (not shown) and the slot 664 defined by the first and second lock retaining members 670, 671 of the support 660 may be configured relative to one another so as to define fixed and released positions. In one embodiment, as shown in FIG. 6A, the opening 900 of the lock 505 and the slot 664 defined by the first and second lock retaining members 670, 671 may be at least partially misaligned to define a fixed position. In the fixed position, a vertically aligned stabilizing member 566 may not be removed laterally as shown. In another embodiment, as shown in FIG. 6B, the opening 900 of the lock 505 and the slot 664 defined by the first and second lock retaining member are aligned as shown, thereby allowing lateral removal of a vertically aligned stabilizing member 566. In various embodiments of the present invention, the locking assembly 500 is configured between fixed and released positions by rotating the lock 505 within the threaded aperture 669 as will be apparent to one of ordinary skill in the art in view of the above disclosure.

Figure 7:
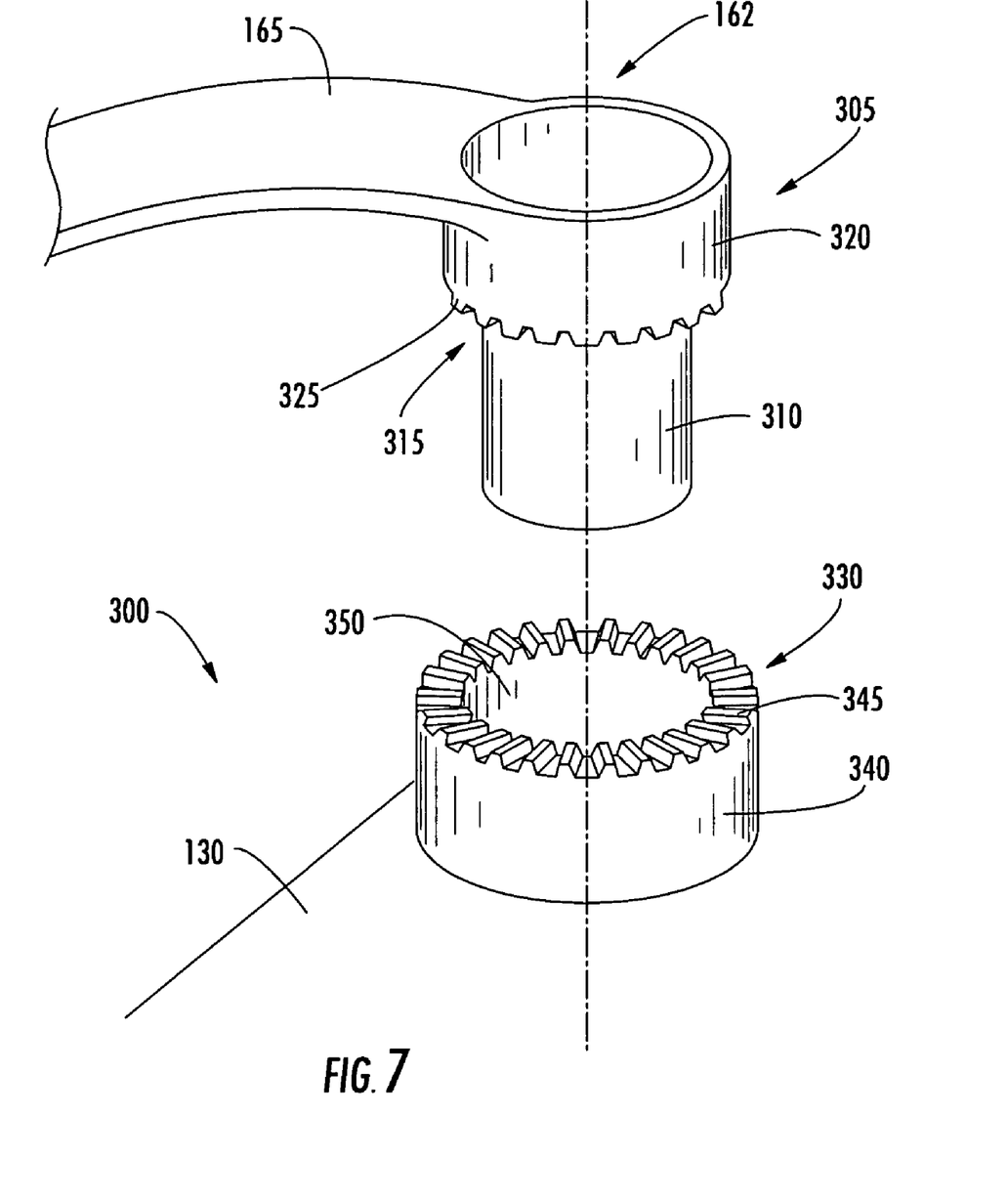
FIG. 7 illustrates a support having a coupling assembly according to one embodiment of the invention.

FIG. 7 illustrates yet another embodiment of the present invention. In particular, a coupling assembly 300 is illustrated for rotatably coupling the support 160 to the base 130. The coupling assembly 300 comprises a coupler 305 and a receptacle 330 that are configured to rotatably engage one another. The coupler 305 is disposed at the proximate end 162 of the support 160 and includes a collar portion 320 and sleeve 310 portion. A transition region 315 is defined between the collar portion 320 and the sleeve portion 310. According to one embodiment, the transition region 315 defines a downwardly directed toothed surface 325.

According to the depicted embodiment, the receptacle 330 is disposed on the base 130 and includes a rim 340 that defines a bore 350. The rim 340 further includes an upwardly directed toothed surface 345 for engaging the downwardly directed toothed surface 325 of the transition region 315 of the coupler 305. During use, the sleeve portion 310 of the coupler 205 is deposited within the bore 350 defined by the rim 340 of the receptacle 330. Thus, the downwardly directed toothed surface 325 of the collar 320 is brought into contact, thereby engaging the upwardly directed toothed surface 345 of the rim 340. Accordingly, a set position is thereby defined wherein the support 160 is prevented from rotating relative to the base 130. A free position is achieved by slightly lifting the support 160 such that the sleeve slides upwardly within the bore 350 to disengage the downwardly directed toothed surface 325 of the collar 320 from the upwardly directed toothed surface 345 of the rim 340. In the free position, the support 160 may freely rotate relative to the base 130.

In various other embodiments, a locking fastener (not shown) may be provided to place a downwardly directed force on the coupler 305, thus, preventing the coupler 305 from disengaging the receptacle 330 and precluding rotational movement. Such a locking fastener may be used to prevent the transducer from being knocked out of position within the preferred viewing area should the fishermen bump or otherwise inadvertently contact the fish finding unit. The locking fastener may include a threaded clamp positioned through the center of the coupler or be applied externally as known to one of ordinary skill in the art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sonar unit comprising:
   a control/display unit;
   a base for supporting said control/display unit;
   a support extending from said base, said support comprising a threaded aperture;
   a stabilizing member;
   a transducer in electronic communication with said control/display unit wherein said transducer is coupled to said stabilizing member;
   a lock comprising:
      a body having a threaded exterior surface disposed between opposed first and second ends, the threaded exterior surface being configured to engage the threaded aperture of said support, and
      a bore for receiving said stabilizing member extending longitudinally through said body between the opposed first and second ends of said body; and
   wherein rotation of said lock within the threaded aperture of said support produces a force that is transmitted through said body to constrict the bore, thereby frictionally engaging said stabilizing member.

2. The sonar unit of claim 1, wherein said support further comprises first and second surfaces, said threaded aperture extends between said first and second surfaces, and said threaded aperture is at least partially tapered between said first and second surfaces of said support.

3. The sonar unit of claim 1, wherein said threaded exterior surface of said body of said lock is at least partially tapered between said first and second ends.

4. The sonar unit of claim 1, wherein said body of said lock has a substantially conical shape.

5. The sonar unit of claim 1, wherein said threaded aperture of said support defines an aperture diameter, and wherein at least a portion of said body of said lock defines an outer diameter that is greater than said aperture diameter.

6. The sonar unit of claim 1, wherein said body of said lock further comprises first and second interior surfaces structured within said body, said first and second interior surfaces extending outwardly from said bore to define a longitudinally extending opening within said body of said lock.

7. The sonar unit of claim 1, further comprising a grip connected to said first end of said body for facilitating tactile manipulation of said lock by a user.

8. The sonar unit of claim 1, wherein said lock comprises a thermoplastic elastomer.

9. The sonar unit of claim 1, wherein said support comprises first and second curved lock retaining members that are configured to define said threaded aperture, and wherein said first and second curved lock retaining members do not completely encircle said threaded aperture, thereby defining a slot.

10. The sonar unit of claim 9, wherein said body of said lock further comprises first and second interior surfaces structured within said body, said first and second interior surfaces extending outwardly from said bore to define a longitudinally extending opening within said body of said lock, and wherein said longitudinally extending opening is alignable with said slot defined between said first and second curved lock retaining members for accommodating release of said stabilizing member from said bore of said lock.

11. A lock assembly for retaining a stabilizing member in a fixed position relative to a support comprising:
   a support comprising a threaded aperture; and
   a lock comprising:
      a body having a threaded exterior surface disposed between opposed first and second ends and, the threaded exterior surface being configured to engage the threaded aperture of said support, and
      a bore for receiving the stabilizing member extending longitudinally through said body between the opposed first and second ends of said body; and wherein rotation of said lock within said threaded aperture of said support produces a force that is transmitted through said body to constrict said bore, thereby frictionally engaging the stabilizing member.

12. The lock assembly of claim 11, wherein said support further comprises first and second surfaces, said threaded aperture extends between said first and second surfaces, and said threaded aperture is at least partially tapered between said first and second surfaces of said support.

13. The lock assembly of claim 11, wherein said threaded exterior surface of said body of said lock is at least partially tapered between said first and second ends.

14. The lock assembly of claim 11, wherein said body of said lock has a substantially conical shape.

15. The lock assembly of claim 11, wherein said threaded aperture of said support defines an aperture diameter, and wherein at least a portion of said body of said lock defines an outer diameter that is greater than said aperture diameter.

16. The lock assembly of claim 11, wherein said body of said lock further comprises first and second interior surfaces structured within said body, said first and second interior surfaces extending outwardly from said bore to define a longitudinally extending opening within said body of said lock.

17. The lock assembly of claim 11, further comprising a grip connected to said first end of said body for facilitating tactile manipulation of said lock by a user.

18. The lock assembly of claim 11, wherein said lock comprises a thermoplastic elastomer.

19. The lock assembly of claim 11, wherein said support comprises first and second curved lock retaining members that are configured to define said threaded aperture, and wherein said first and second curved lock retaining members do not completely encircle said threaded aperture, thereby defining a slot.

20. The lock assembly of claim 19, wherein said body of said lock further comprises first and second interior surfaces structured within said body, said first and second interior surfaces extending outwardly from said bore to define a longitudinally extending opening within said body of said lock, and wherein said longitudinally extending opening is alignable with said slot defined between said first and second curved lock retaining members to accommodate release of said stabilizing member from said bore of said lock.

21. The lock assembly of claim 11, further comprising an object coupled to said stabilizing member.

22. An apparatus for supporting a stabilizing member at a desired vertical position, comprising:
a base defining a receptacle;
a support having proximate and distal ends, wherein said proximate end includes a sleeve for rotatably engaging said receptacle of said base, and wherein said distal end of said support defines a threaded aperture;
a stabilizing member having a length defined by opposed ends; and
a lock configured to rotatably engage said threaded aperture of said support, thereby defining a locked position wherein said lock frictionally engages said stabilizing member to remain in a desired vertical position.

23. The apparatus of claim 22:
wherein said receptacle of said base comprises an upwardly directed rim defining a bore extending through said base, wherein said rim comprises at least one upwardly directed tooth,
wherein said proximate end of said support defines a coupler having a collar portion, a sleeve portion and a transition region defined therebetween, wherein the sleeve portion is deposited into said bore defined in said base and the transition region of said coupler defines at least one downwardly directed tooth for engaging said at least one upwardly directed tooth of said rim of said base, thereby defining a fixed position wherein said support is prevented from rotating relative to said base, and
wherein said support is released from said fixed position by sliding said support upwardly along said sleeve, thereby disengaging said at least one downwardly directed tooth of said coupler from said at least one upwardly directed tooth of said rim of said base.

* * * * *